(12) United States Patent
Belz

(10) Patent No.: US 7,533,417 B2
(45) Date of Patent: May 12, 2009

(54) METHOD FOR OBTAINING PHOTO PROPERTY RELEASE

(75) Inventor: Steven M. Belz, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 832 days.

(21) Appl. No.: 10/705,658

(22) Filed: Nov. 10, 2003

(65) Prior Publication Data
US 2005/0102521 A1 May 12, 2005

(51) Int. Cl.
*G06K 9/00* (2006.01)
(52) U.S. Cl. .......................... 726/26; 726/33
(58) Field of Classification Search ............. 726/26, 726/33; 716/26, 33
See application file for complete search history.

(56) References Cited

U.S. PATENT DOCUMENTS

| 4,981,370 A | * | 1/1991 | Dziewit et al. | 713/176 |
| 6,249,316 B1 | * | 6/2001 | Anderson | 348/333.05 |
| 2004/0135902 A1 | * | 7/2004 | Steensma | 348/231.99 |

* cited by examiner

*Primary Examiner*—Jacob Lipman
(74) *Attorney, Agent, or Firm*—Frank Pincelli

(57) ABSTRACT

A system and method for managing photo releases which includes a digital image capture device a device for display at least a representative image of a captured original image and for displaying a photo release associated with the at least one individual with respect to the captured digital image. The display device provided for the obtaining of an authorization signature by the at least one individual with respect to the original captured digital image; and for associating the authorization signature as metadata with respect to the original image.

13 Claims, 3 Drawing Sheets

METHOD FOR OBTAINING PHOTO PROPERTY RELEASE

FIELD OF THE INVENTION

The present invention relates to the digital acquisition of obtaining property releases, and more particularly to systems for obtaining and managing digitally acquired property releases.

BACKGROUND OF THE INVENTION

Photo Property release forms and Model Release forms are often required by professional photographers to gain permission to use their subject's image (e.g., sell, publish, reproduce). These documents specify the conditions under which a subject's image may be used (e.g., financial compensation, duration of use, and images included).

Traditionally, such agreements have been described through the use of a paper-based system where the participant signs a legal release form subsequent to image capture. The photographer typically modifies the release form so that the correct terms are specified. In addition, they must catalog the release form in some way so that he/she is certain the correct release is associated with the photographed images for which permission has been granted. For situations where multiple individuals are required to grant permission for a single photographic release, the situation becomes more complicated. For these situations, the professional must ensure that signatures have been obtained for each individual and that the proper signature is associated with the proper individual within the image. Further, depending on the circumstances in which the photographer is operating, performing these secondary (image and paper management) tasks may distract the photographer from performing their primary task of capturing the currently evolving scene.

There is a need, therefore, for an improved system for managing the largely paper-based method of secondary (e.g., photo release) document management noted above.

SUMMARY OF THE INVENTION

In accordance with one aspect of the present invention there is provided a system for managing photo releases, comprising:
  a digital capture device for capturing an original image having at least one individual;
  a device for producing a representative image of the captured original image;
  a display device for displaying the representative image and for displaying a release associated with the at least one individual and the representative image; and
  an input device associated with the display device for receiving an authorization signature by the at least one individual with respect to the photo release.

In accordance with another aspect of the present invention there is provided a method for managing photo releases, comprising:
  capturing a digital image, an original image of at least one individual;
  producing a representative image of the captured original image;
  displaying the representative image and a photo release associated with the at least one individual with respect to the original image;
  obtaining an authorization signature by the at least one individual with respect to the original image; and
  associating the authorization signature as metadata with respect to the original image.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The invention has been described in detail with particular reference to certain preferred embodiments thereof, but it will be understood that variations and modifications can be effected within the spirit and scope of the invention.

Figure 1:
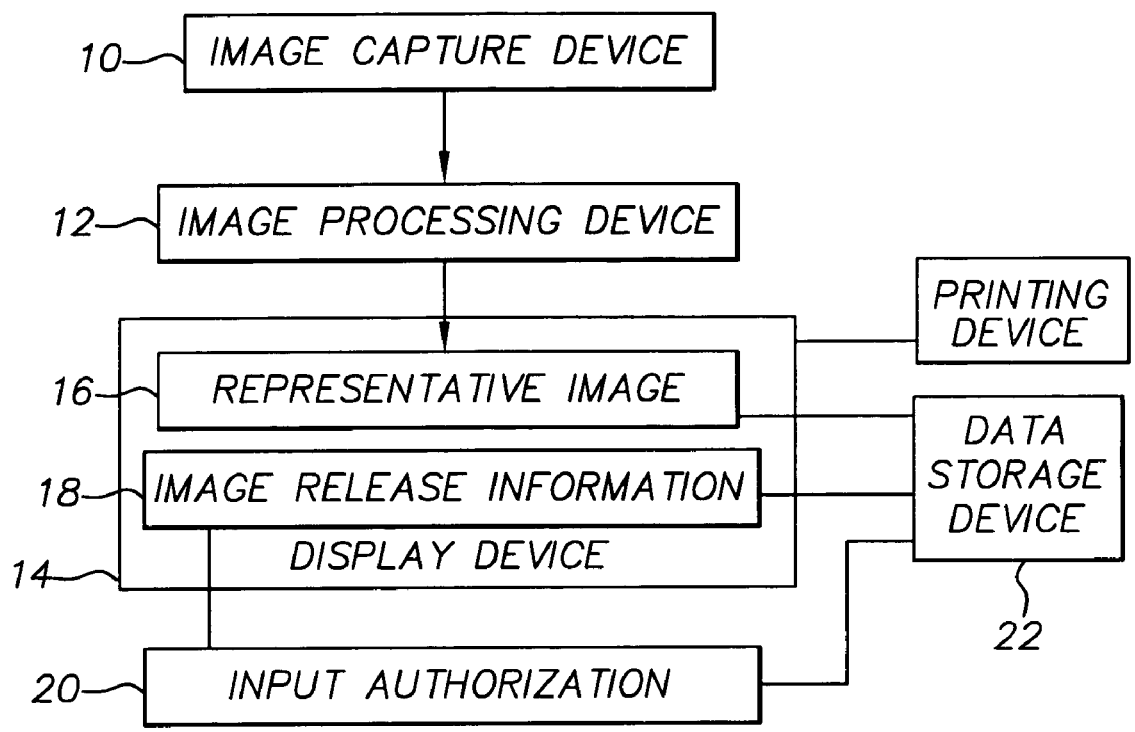
FIG. 1 illustrates a system made in accordance with the present invention.

Referring to FIG. 1, there is illustrated a block diagram of an embodiment of a system 10 for managing photo releases in accordance with the present invention. As shown in FIG. 1, system 10 includes a digital capture device 10 for capturing digital images, an electronic display device 14 for displaying an representative image 16 of a captured image and for displaying an associated release information form 18, an input device 20 by which information may be entered on the release form and where an individual may provided authorization for use of the captured image, and a storage device 22 for storing the representative image, associated release form.

In the embodiment illustrated the digital capture device 10 is a digital camera that typically captures high resolution digital images and the display device is a personal d assistant (PDA). The PDA is provided with a display screen for displaying a representative image 16 of the captured high resolution digital image captured by the camera. The digital camera 10 may communicate (transfer) information to the PDA in any appropriate manner, for example by direct or wireless connection. The digital camera may produce the representative image or the PDA may produce the representative image. The PDA preferably as illustrated with provided with a least one release form in memory for display. The PDA is provided with appropriate software for associating at least one representative image with a release form. The representative image and associate release form are displayed as a single document. In the embodiment illustrated the PDA has one or input devices for entering information in to the PDA and for association with the release form, example but not limited to, touch pad or stylus. In this way a indicucicual that has been captured in the captured digital image can provide authorization to use the image by electronically signing the release form. The authorized release form then is stored locally or on a separate storage device 22, for example, but not limited to, a personal computer. A printing device 52 may also be connected to device 14 for printing of hard copy release forms to be signed.

Figure 2:
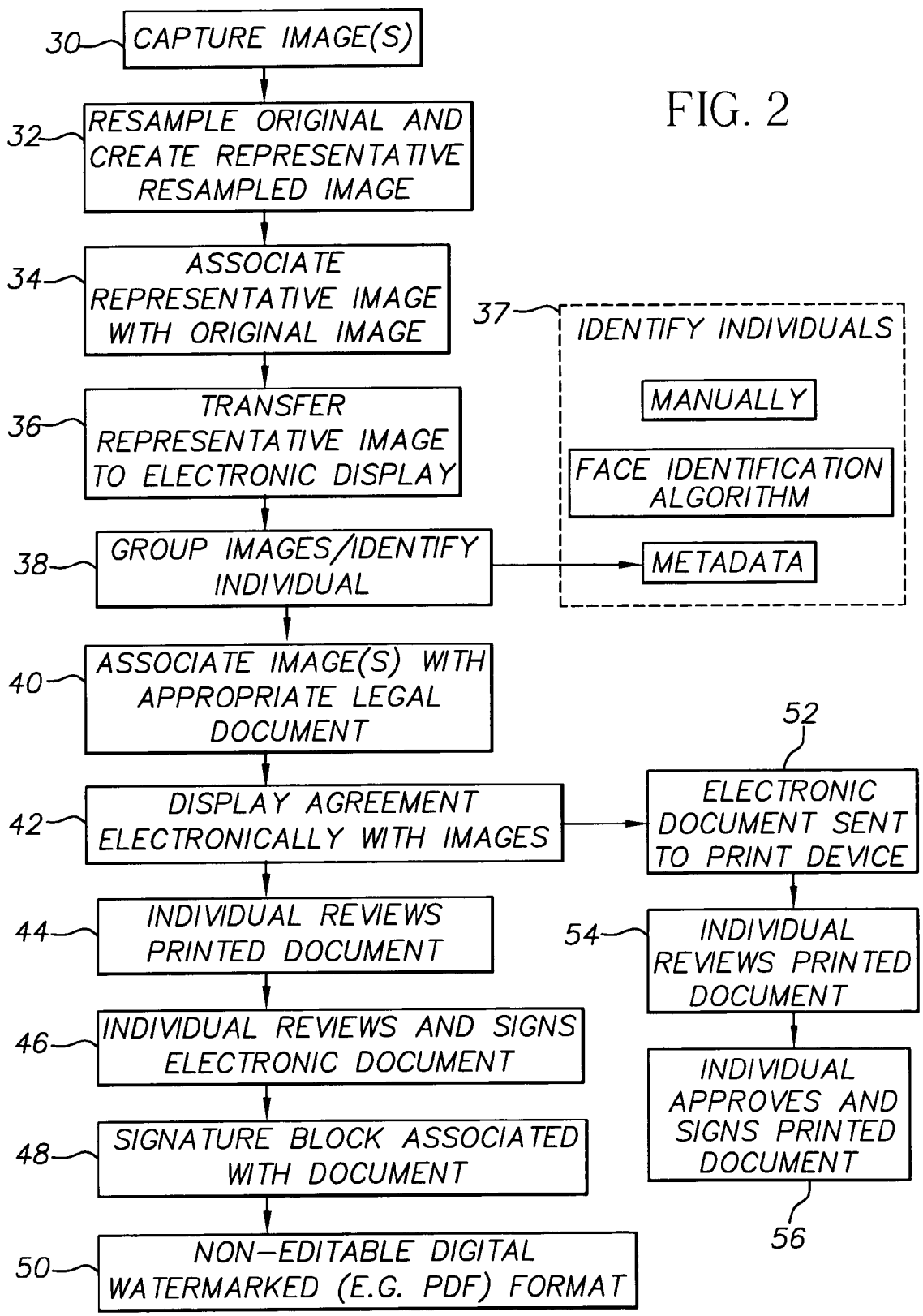
FIG. 2 illustrates a flow diagram of the operation of the system of FIG. 1.

FIG. 2 shows a block diagram of the preferred workflow for managing photo releases. The digital capture device 10 captures an image at step 30. Subsequently, the image data are resampled (e.g., via thumbnail or JPEG2000 standard) at step 32 produce a representative image, associated with the original image at step 34. In the embodiment illustrated this resampling is done by the image capture device. The representative image at step 36 is transmitted to an electronic display device 14 which in the embodiment illustrated is a PDA. The received representative image 16 is used in conjunction with appropriate associated release information 18.

Once the representative image 16 is resident in the electronic display device 14, individuals or objects of interest requiring release are identified 36. The system 10 through the PDA or other devices supports various methods for identification of different individuals within the same photograph (captured image) and the same individual in multiple photographs 37. This may be accomplished manually or through the use of a variety of image processing algorithms on the device 14, camera 10 or storage device 22—including, but not limited to face recognition and metadata technologies. In the preferred embodiment the software for identification of individuals is provided on device 14.

The software on device 14 supports at least two different mechanisms for producing a signed copy of the release form. The first is by hardcopy. Once the image(s) are associated the release form/document and the terms have been modified appropriately, the form could be sent to a print device 52—thereafter reviewed 54, signed 56 and handled like a conventional release form (except that the sub-sampled images will be associated with—and the photographer will have the option of showing within—the document).

A second mechanism associates the appropriate release form/document with the image for which the release is being sought 40 and electronically displays 42 that release form and the sub sampled (representative) image for which the release applies. The individual that is to sign the release form, reviews 44 and if approved electronically signs 46 the electronic copy of the release form. Once signed, no further changes can be made to the document and it is saved in a non-editable format 48 storage device 22 and may be associated with a digital watermarking technology for further security 50. The non-editable format can then be printed or emailed to the individual (this may be done automatically if the individual provides and email address and the personal digital device has modem or similar communications ability). The signed release is always associated with the captured high resolution image that is stored on storage device 22. The signed release information is associated as meta data to the captured original digital image.

Figure 3:
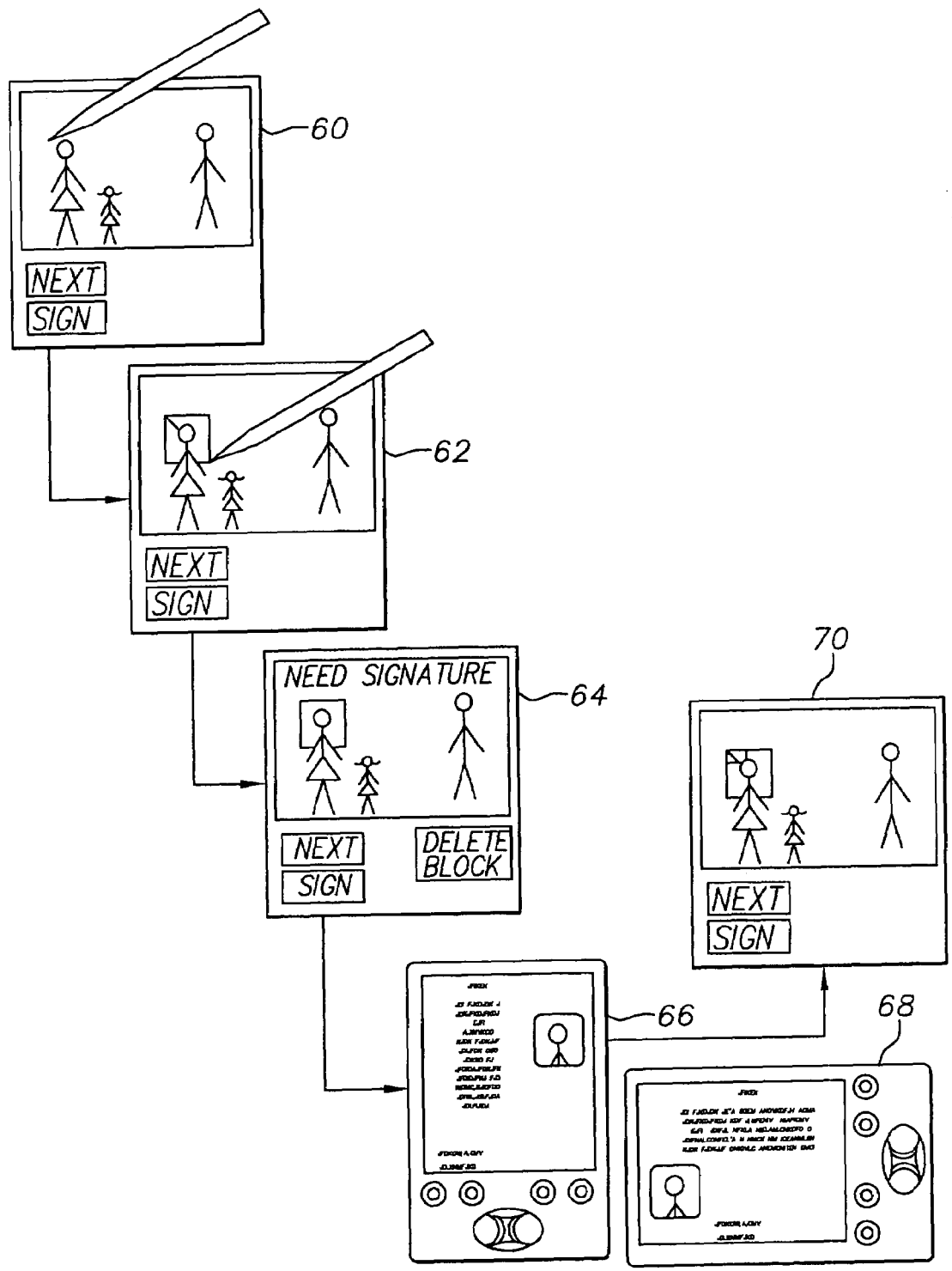
FIG. 3 illustrates various screen displays of the display device of the system of FIG. 1.

One implementation for identifying individuals within a representative image is shown in FIG. 3 wherein successive display screens of the display device 14 is illustrated. First a representative image is shown by display screen 60 and an individual would identify an area by clicking or dragging a stylus over the region of interest as shown by display screen 62. This would result in an indication that a signature was needed as shown by display screen 64. The individual associated with the region of interest could then offer an electronic signature as shown by display screen 66. A horizontal orientation is also shown by display screen 68. Once the signature has been obtained, an indication that a signature was needed would be replaced by an indication that the signature had been attained as illustrated by display screen 70. This process would then be repeated for each of the required multiple signatures, the system is able to identify through a visual representation of individuals who have and who have not yet signed a release form.

It is to be understood that various changes and modification may be made without departing from the present invention. For example, while separate devices have been shown for the PDA and the storage and printing devices, these devices may be provided in any combined manner. The PDA and storage device may comprise a portable personal computer that may have printing capabilities. Alternatively, the digital capture device and PDA may be combined as a single device. The present invention is defined by the claim that following.

PARTS LIST 10 image capture device
12 image processing device
14 display device
16 representative image
18 image release information
20 input device
22 data storage device
30 capture image(s)
32 resampled image
34 associate representative image with original
36 transfer representative image to electronic display
37 identify individuals
38 group images
40 associate image(s) with legal document
42 display agreement with images
44 printed document
46 signs electronic document
48 signature block
50 digital watermarked format
52 printing device
54 review printed document
56 sign printed document
60 display screen
62 display screen
64 display screen
66 display screen
68 display screen
70 display screen

What is claimed is:

1. A system for managing photo releases, comprising:
   a digital capture device for capturing an original image having a visual representation of at least one individual;
   a device for producing a representative image of said captured original image;
   a display device for displaying said representative image and for displaying a photo release associated with said at least one individual and said representative image; and
   an input device associated with said display device that designates a region of interest within the representative image that includes the visual representation of said at least one individual, and that enters an authorization signature by said at least one individual with respect to said photo release;
   wherein the designation of said region of interest causes a first visual indicator to be displayed on the display device that indicates a release signature is required from the individual; and
   wherein the entry of said authorization signature causes a second visual indicator to be displayed on the display device that indicates the release signature has been obtained.

2. A system according to claim 1, wherein the second visual indicator is associated with said region of interest.

3. A system according to claim 1, wherein the second visual indicator is provided by highlighting at least a portion of said area of interest on the display device.

4. A system according to claim 1, wherein at least a portion of the representative image defined by said region of interest and said release are concurrently displayed by on the display device after receipt of said authorization signature.

5. A system according to claim 1 wherein said digital capture device, said device producing a representative image for displaying and said display device are provided in a single device.

6. A system according to claim 1 wherein a plurality of original images are obtained containing the same at least one individual and a single photo release is associated with each of said original images.

7. A system according to claim 1 wherein information is associated with said original image when said authorization signature is obtained with respect to said at least one individual.

8. A system according to claim 7 wherein said information and said original image is stored on a database.

9. A system according to claim 1 wherein once said authorization signature is obtained, said photo release is no longer capable of being modified.

10. A system according to claim 9 wherein digital watermarking is used to prevent unnoticed modifications.

11. A method for managing photo releases, comprising:
   capturing an original digital image having a visual representation of at least one individual;
   producing a representative image of said captured original image;
   displaying said representative image and a photo release associated with said at least one individual with respect to said original image;
   designating a region of interest within the representative image that includes the visual representation of said at least one individual, wherein the designation of said region of interest causes a first visual indicator that an authorization signature is required from the individual to be displayed on the display device;
   obtaining an authorization signature by said at least one individual with respect to said original image, wherein the receipt of said authorization signature causes a second visual indicator that the authorization signature has been obtained to be displayed on the display device; and
   associating said authorization signature as metadata with respect to said original image.

12. A method according to claim 11 further comprising the step of:
   associating said photo release with respect to said captured original image as metadata.

13. A method according to claim 11 wherein upon obtaining an authorization signature by said at least one individual, said original image can no longer be modified.

* * * * *